(12) United States Patent
Stellman

(10) Patent No.: US 10,435,092 B2
(45) Date of Patent: Oct. 8, 2019

(54) TRACK TENSIONER

(71) Applicant: The Charles Machine Works, Inc., Perry, OK (US)

(72) Inventor: Vernon T. Stellman, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 139 days.

(21) Appl. No.: 15/724,409

(22) Filed: Oct. 4, 2017

(65) Prior Publication Data

US 2018/0105217 A1 Apr. 19, 2018

Related U.S. Application Data

(60) Provisional application No. 62/407,912, filed on Oct. 13, 2016.

(51) Int. Cl.
*B62D 55/30* (2006.01)
*B62D 55/08* (2006.01)
*B62D 55/06* (2006.01)

(52) U.S. Cl.
CPC .............. *B62D 55/30* (2013.01); *B62D 55/06* (2013.01); *B62D 55/08* (2013.01)

(58) Field of Classification Search
CPC ......... B62D 55/30; B62D 55/08; B62D 55/06
See application file for complete search history.

(56) References Cited

U.S. PATENT DOCUMENTS

| | | | |
|---|---|---|---|
| 2,315,421 A | 3/1943 | Heaslet | |
| 5,191,951 A | 3/1993 | Bargfrede et al. | |
| 6,158,827 A | 12/2000 | Hostetler | |
| 6,354,678 B1 | 3/2002 | Oertley | |
| 8,240,783 B2 | 8/2012 | Johnson et al. | |
| 8,556,354 B2 | 10/2013 | Johnson et al. | |
| 8,870,303 B2 | 10/2014 | Moser | |
| 9,586,635 B2 | 3/2017 | Sewell | |
| 2006/0183585 A1 | 8/2006 | Fairchild | |

OTHER PUBLICATIONS

The Charles Machine Work, Inc., "RT125 Quad Tractor", catalog, 5 pages, Oct. 7, 2016, USA.

*Primary Examiner* — Joseph M Rocca
*Assistant Examiner* — Harold Eric Pahlck, III
(74) *Attorney, Agent, or Firm* — Tomlinson McKinstry, P.C.

(57) ABSTRACT

A track assembly is formed from a frame, first and second idler wheels, an endless track, and a tensioning assembly. The track is stretched around the wheels. By using the tensioning assembly to increase or decrease the distance between the first and second idler wheels, the tension within the track is adjusted. The tensioning assembly is formed from an outer tube, an inner member having an indicator, and a cage assembly having an opening. The outer tube is supported by the frame and is coupled to the second idler wheel. The inner member is telescopically received within the outer tube and is coupled to the first idler wheel. The opening is alignable with the indicator in response to relative longitudinal movement of the cage assembly and the inner member.

14 Claims, 9 Drawing Sheets

— 1 —

TRACK TENSIONER

CROSS REFERENCE TO RELATED APPLICATION

This application claims the benefit of U.S. Provisional Patent Application Ser. No. 62/407,912 filed Oct. 13, 2016, the entire contents of which are incorporated herein by reference.

FIELD

The present invention relates to track assemblies and more particularly to tools and methods for adjusting track tension.

SUMMARY

A track assembly is formed from an elongate track frame, first and second idler wheels, an endless track, and a track tensioning assembly. The elongate track frame has opposed ends. The first idler wheel is movably supported by the track frame at or adjacent one of its ends. The second idler wheel is statically supported by the track frame at or adjacent its opposite end. Both idler wheels are surrounded by the endless track.

The track tensioning assembly is formed from a static elongate outer tube, a longitudinally movable elongate inner member, a cage assembly, and a compressible spring. The outer tube is supported by the track frame. The inner member has opposed first and second ends and is partially received within the outer tube in telescoping relationship thereto. Adjacent its second end, the inner member carries a compact external indicator. At its first end, the inner member is coupled to the first idler wheel. The cage assembly has opposed open and closed ends and an outer shell at least partially surrounding the open end. The outer shell has at least one opening formed therein. Housed within the cage assembly, the compressible spring engages the inner member's second end. At its second end, the inner member is telescopically receivable within the open end of the cage assembly. The opening is alignable with the indicator in response to relative longitudinal movement of the inner member and the cage assembly.

A tensioning assembly is formed from an elongate member, a cage assembly, and a compressible spring. The elongate member has opposed first and second ends and is configured for sliding movement on a frame of an endless track assembly. At or adjacent its second end, the elongate member carries a compact external indicator. The cage assembly has opposed open and closed ends and an outer shell at least partially surrounding the open end. The outer shell has at least one opening formed therein. Housed within the cage assembly, the compressible spring engages the inner member's second end. At its second end, the elongate member is receivable within the open end of the cage assembly. The opening is alignable with the indicator in response to relative longitudinal movement of the elongate member and the cage assembly.

— 2 —

Figure 2:
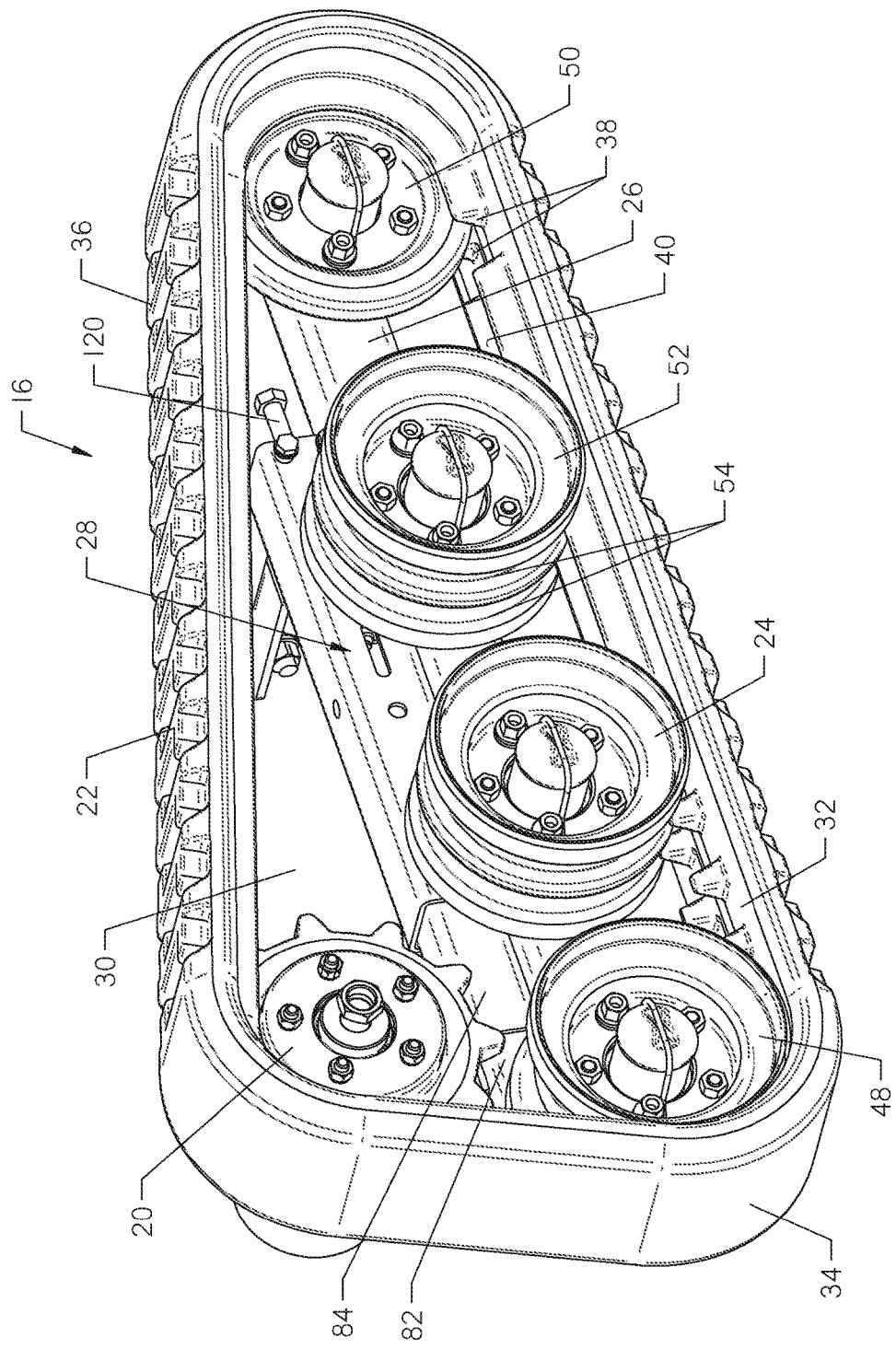
FIG. 2 is a perspective view of one of the track assemblies of FIG. 1.
Figure 3:
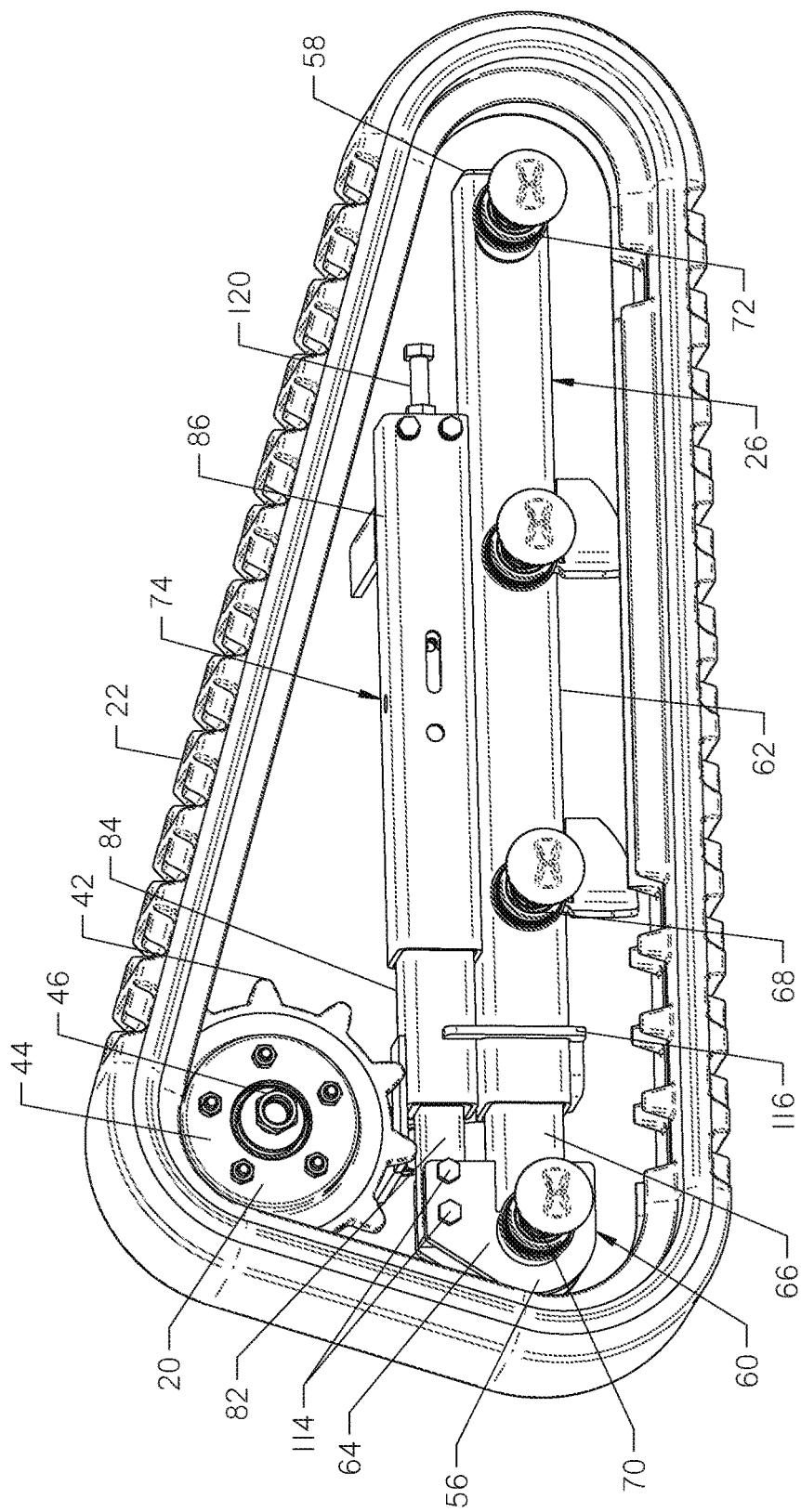

FIG. 3 is a perspective view of a portion of the track assembly of FIG. 2. The rollers have been removed.

Figure 4:
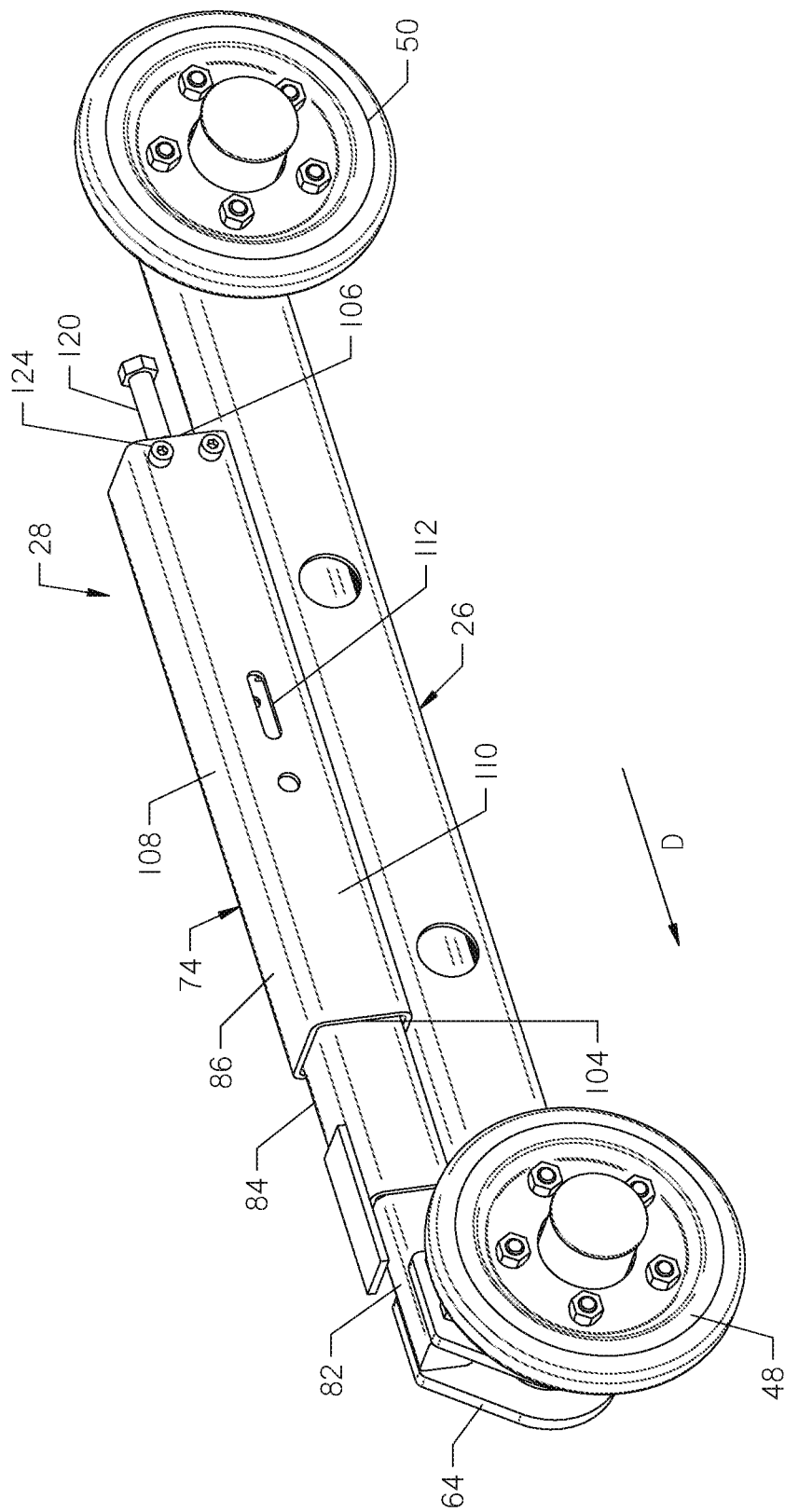

FIG. 4 is a perspective view of portions of the track assembly of FIG. 2. Shown are a track frame, first and second idler wheels, and a track tensioning assembly, including its housing.

Figure 5:
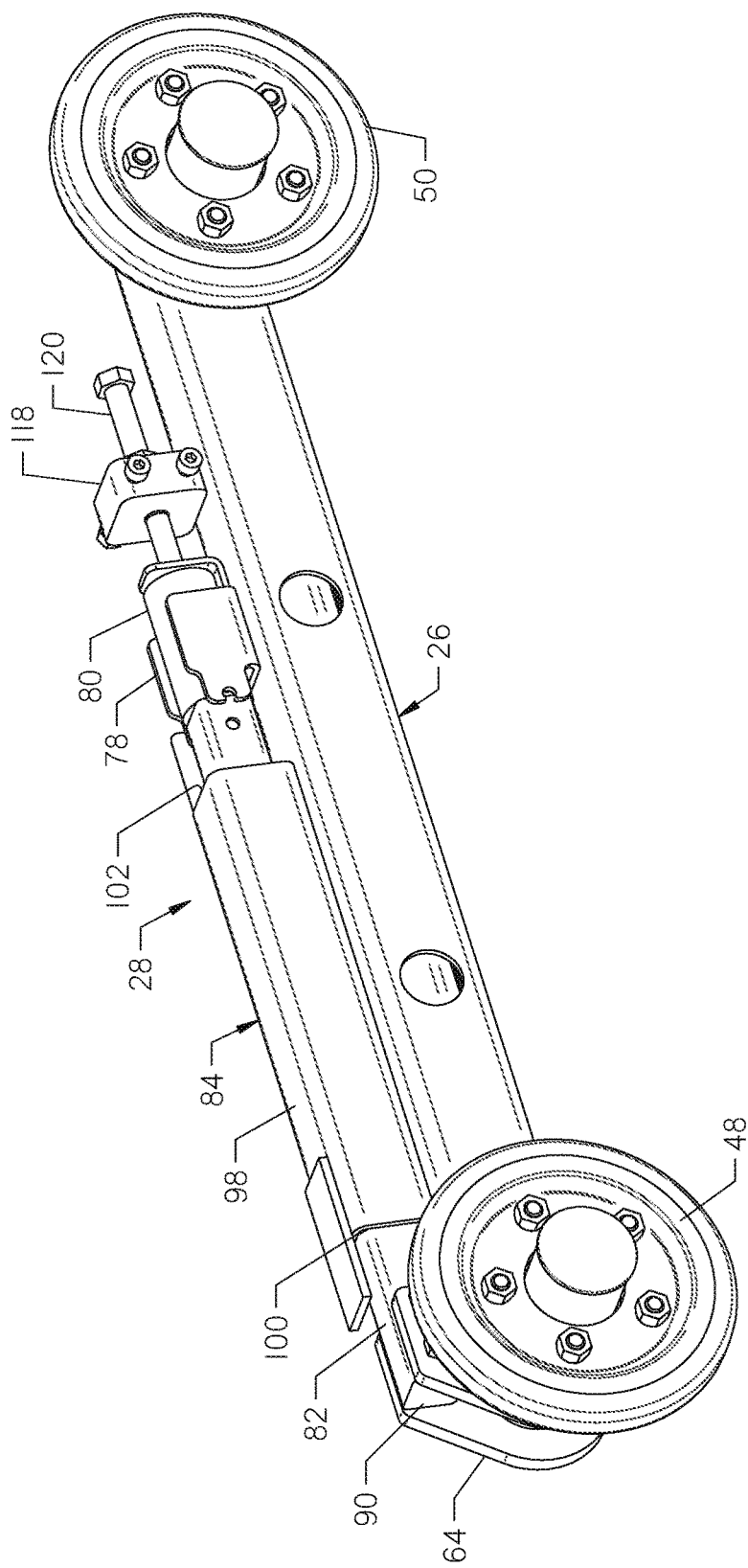

FIG. 5 is a perspective view of the track frame, idler wheels, and track tensioning assembly shown in FIG. 4. The housing of the tensioning assembly has been removed.

Figure 6:
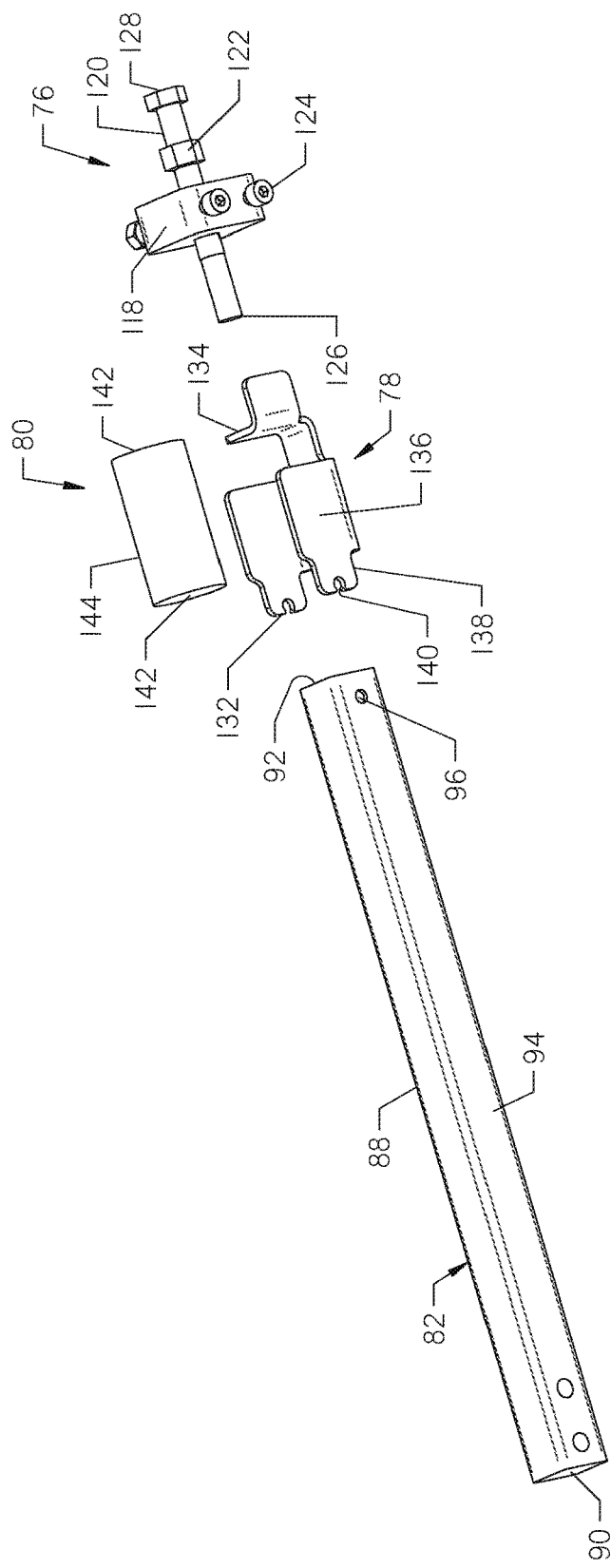

FIG. 6 is an exploded view of a portion of the track tensioning assembly depicted in FIG. 4. Shown are an inner member, a cage assembly, a compression spring, and a linear actuator.

Figure 7:
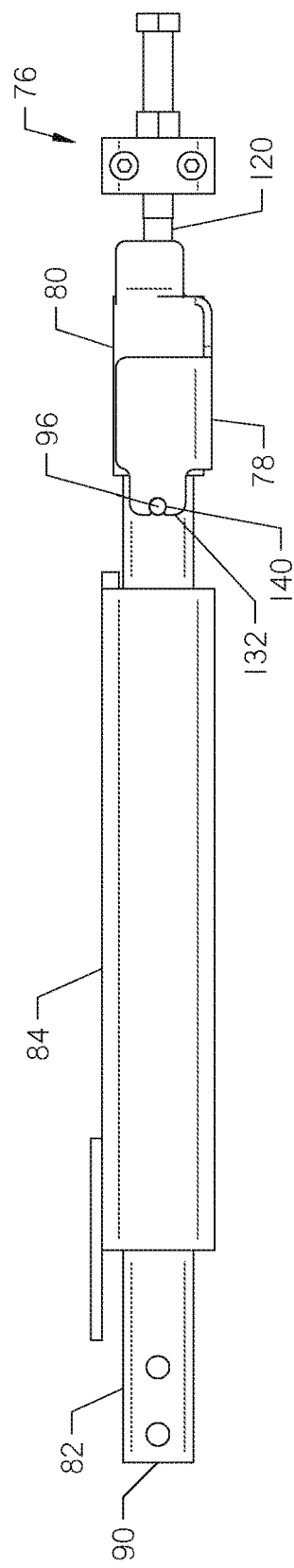

FIG. 7 is an enlarged side elevation view of the track tensioning assembly shown in FIG. 5.

Figure 8:
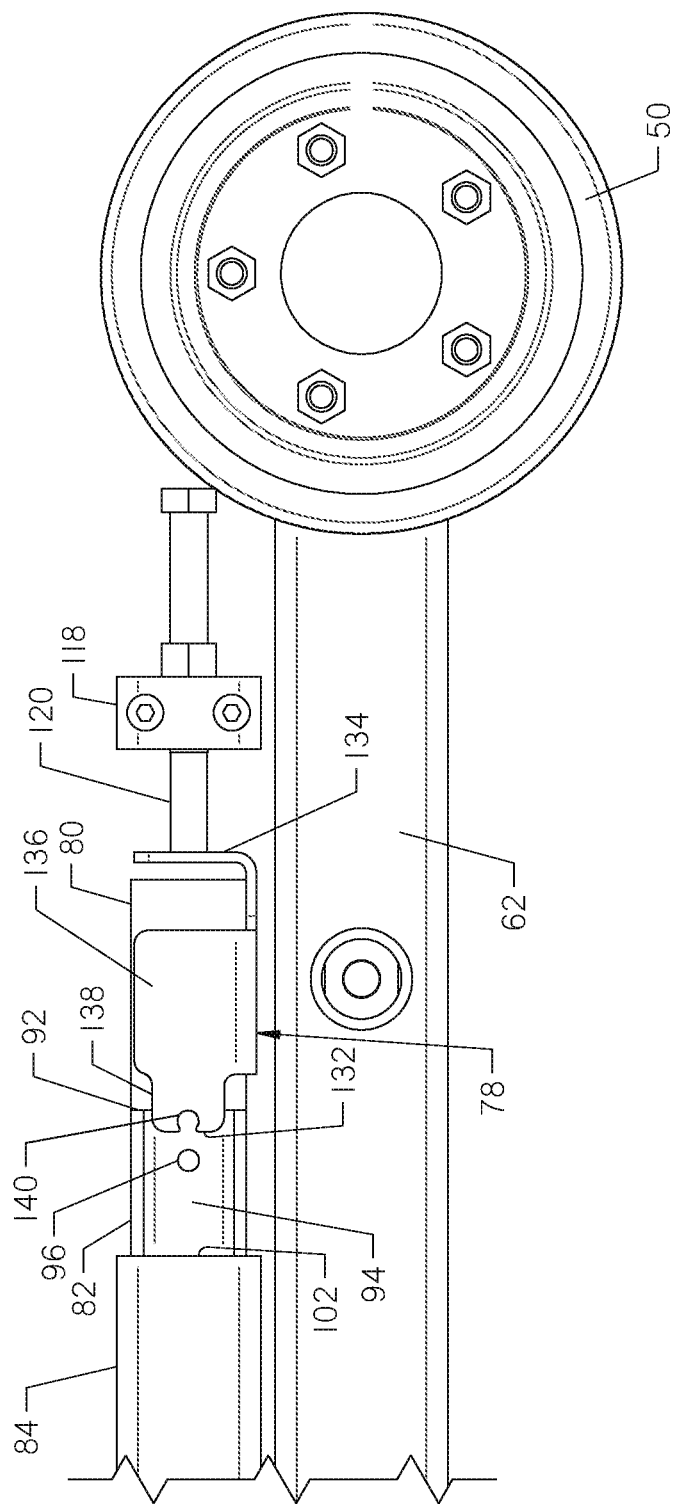

FIG. 8 is an enlarged side elevation view of portions of the track frame and track tensioning assembly of FIG. 5.

Figure 9:
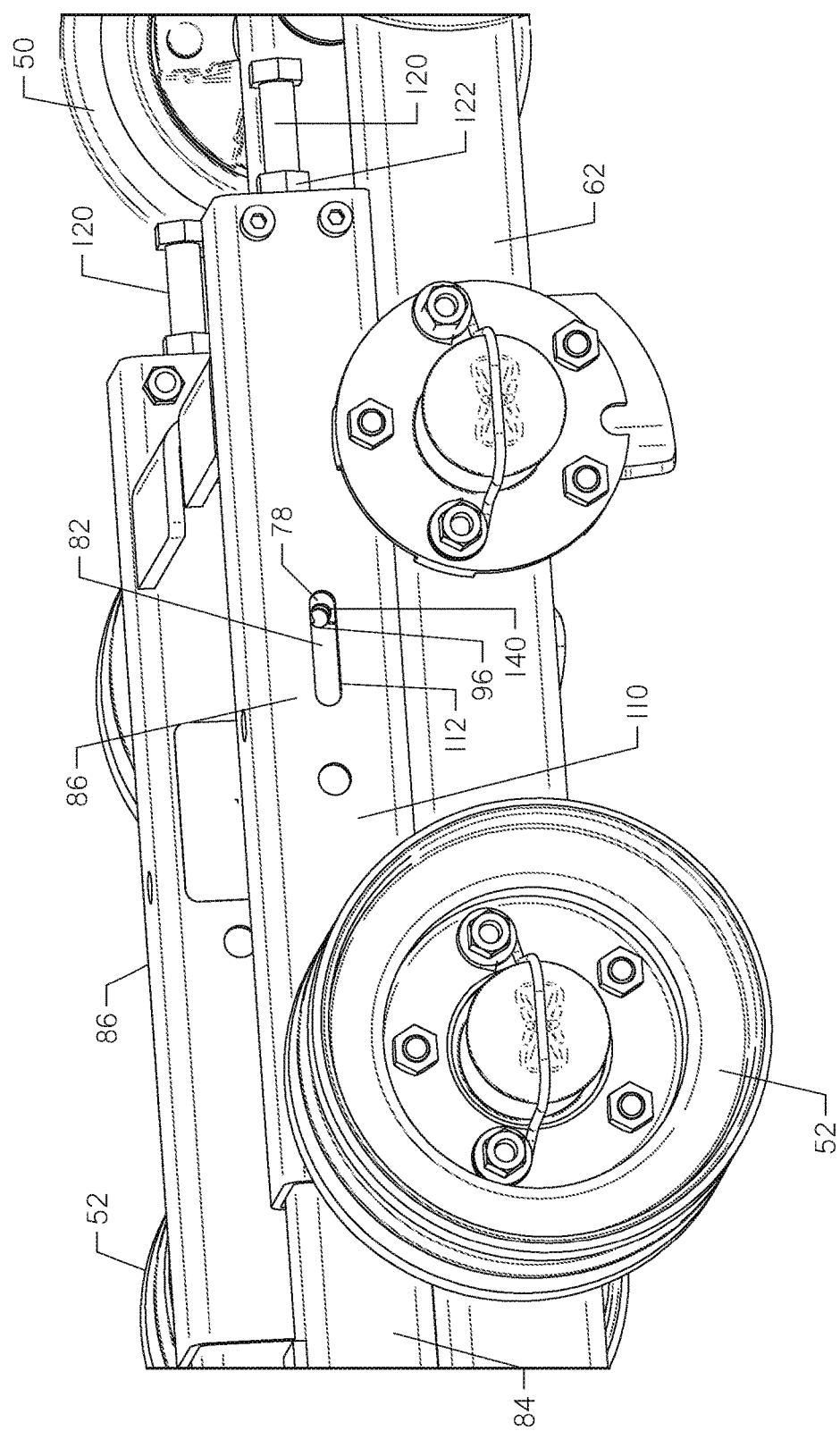

FIG. 9 is an enlarged perspective view of a portion of a pair of the track assemblies shown in FIG. 2 arranged in side-by-side relationship. A tension adjustment indicator registers with a viewing window formed in the housing.

DETAILED DESCRIPTION

Many work machines, such as skid steers and trenching machines, use continuous track systems for propulsion. Continuous track systems are strong and durable, and they provide improved mobility over rough or soft terrain. In comparison to wheeled vehicles, tracked vehicles have the advantage of distributing weight over a larger surface area, which makes the tracked vehicle less likely to sink into soft ground.

To reduce the risk of the track slipping from the track frame or excessive wear in the system, a proper amount of tension should be maintained on the track. Thus, it is useful for operators to have a way to check and adjust the track tension. The presently disclosed inventions are directed to new tools and methods of adjusting and monitoring track tension.

Shown in Figure it is a tracked vehicle 10 that is propelled by a continuous track system. The tracked vehicle 10 comprises a chassis 12, an engine (not shown) that is supported by the chassis 12, an operator station 14, and a plurality of track assemblies 16. The chassis 12 may support a work tool, such as a backfill blade, or attachments, such as a plow or earth saw. The tracked vehicle 10 shown in FIG. 1 features a bucket 18.

The track assemblies 16 engage the ground and support the chassis 12 of the tracked vehicle 10. An operator controls the power from the engine to rotate the drive axles and the connected drive sprockets and tracks. Moving the tracks in a first direction causes the vehicle 10 to drive forward, and moving the tracks in a second direction causes the vehicle 10 to drive in reverse. By driving one track faster than the other, the operator may cause the vehicle 10 to turn toward the slower track. The vehicle 10 may be steered by the operator using the steering controls to turn the track assemblies 16 at the front of the vehicle 10.

Figure 1:
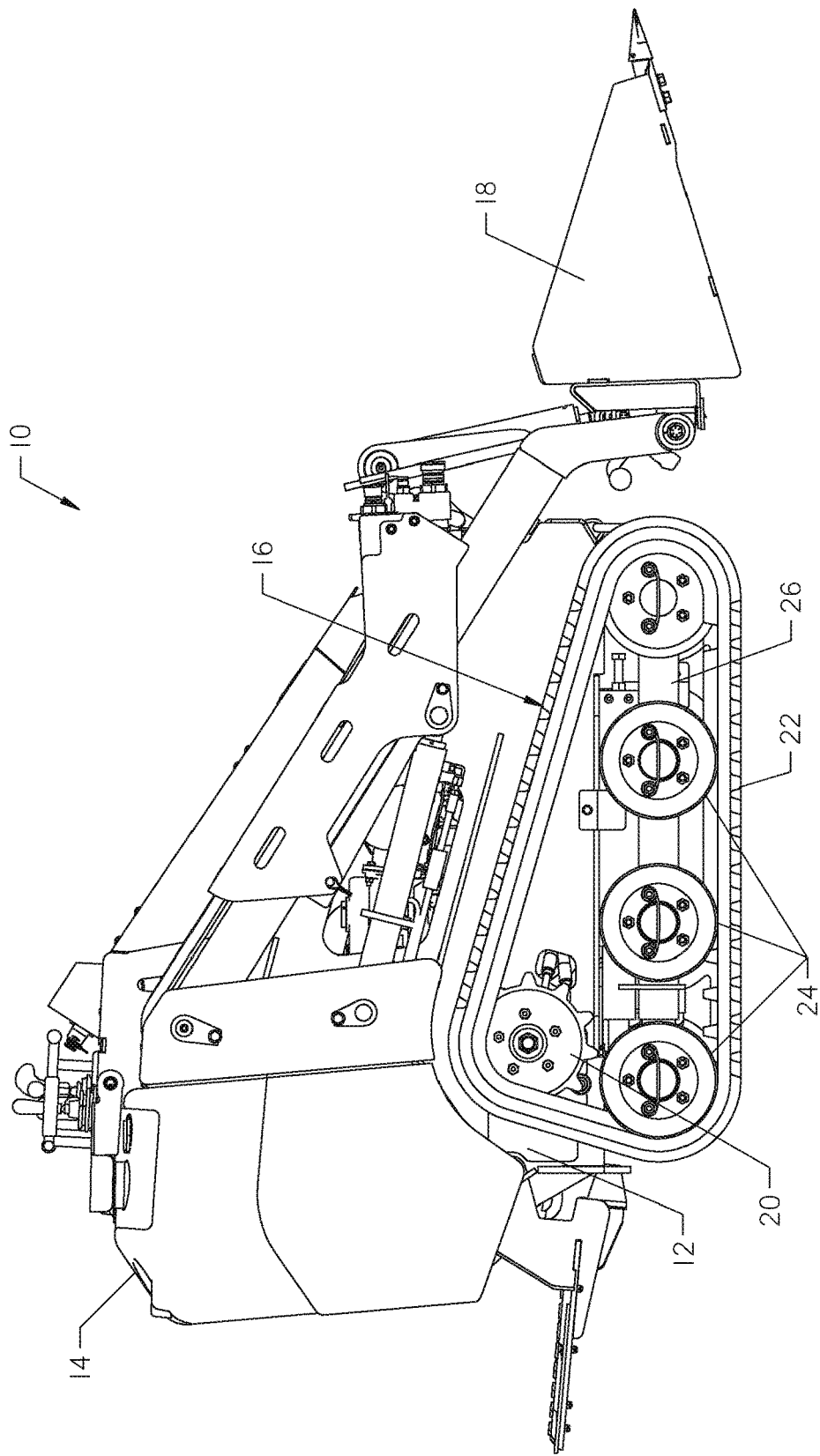
FIG. 1 is a side elevation view of a work machine supported by a pair of track assemblies.

With reference to FIGS. 1 and 2, each track assembly 16 comprises an endless track 22, a drive sprocket 20, a plurality of track-engaging rollers 24, a track frame 26, and a track tensioning assembly 28. As shown, the track assemblies 16 are generally triangular in shape. However, the track assemblies 16 may have any suitable is shape, including an oblong shape.

With reference to FIGS. 2 and 3, the endless track 22 is formed from a strong, durable, and flexible material, such as rubber. The track 22 forms a continuous loop surrounding an interior area 30. The track 22 has an inner surface 32 that bounds the interior area 30 and an outer surface 34 that contacts the ground. To provide improved traction, the outer surface 34 may be treaded. The treads may be characterized by a pattern of grooves 36 formed in at least a portion of the area where the track 22 makes surface contact. Formed on the inner surface 32 is a plurality of circumferential ridges 38 in parallel relationship. A circumferential channel 40 is formed between an adjacent pair of circumferential ridges 38 and opens toward the interior area 30.

The drive sprocket 20 is formed from a strong and durable material, such as steel. Preferably, the drive sprocket 20 has the shape of a disc having a plurality of projections 42 extending radially outward. The drive sprocket 20 may have a width sized to be closely received within the circumferential channel 40 formed in the endless track 22. The drive sprocket 20 may have a central track hub 44 which connects to a hub assembly 46. The hub assembly 46 transfers torque to the drive sprocket 20 from a drive axle. Mounted on the hub assembly 46, the drive sprocket 20 is rotatable relative to the frame 26.

Shown in FIG. 2, the plurality of rollers 24 comprise a first idler wheel 48, a second idler wheel 50, and a plurality of bogie wheels 52 situated between the first and second idler wheels 48, 50. The rollers 24 are formed from a strong and durable material, such as steel. The rollers 24 may have a width sized to be closely received within the circumferential channel 40 formed in the endless track 22. The rollers 24 may comprise a plurality of circumferential grooves 54 configured such that the circumferential ridges 38 of the endless track 22 may be seated within the grooves 54.

With reference to FIGS. 2-5, the track frame 26 is formed from a strong and durable material, such as steel. The track frame 26 has opposed first and second ends 56, 58 and comprises a first support element 60 and a second support element 62. As best shown in FIGS. 3-5, the first support element 60 has a coupler assembly 64 and a rod 66 that is slideably received within a passage formed in the second support element 62. Preferably, the first and second support elements 60, 62 each have a cross-sectional profile having the shape of a rectangle.

A plurality of axles 68 are situated on the first and second support elements 60, 62. One of the axles 68 is a first idler wheel axle 70 situated on the first support element 60. Another of the axles 68 is a second idler wheel axle 72 situated on the second support element 62. Such positioning of the axles 68 allows the first idler wheel 48 to move relative to the second end 58 of the frame 26 so that the track tension can be adjusted.

Turning to FIGS. 4-8, the track tensioning assembly 28 comprises a beam assembly 74, a linear actuator 76, a cage assembly 78, and a compression spring 80. The beam assembly 74 is formed from a strong and durable material, such as steel. The beam assembly 74 comprises an inner member 82, an outer tube 84, and a housing 86.

The inner member 82 has an elongate body 88 having opposed first and second ends 90, 92 and a pair of opposed side walls 94. A compact external indicator 96 is carried by the inner member 82 at or adjacent its second end 92. The indicator 96 may be any suitable marking carried by the inner member 82, including a colored marking or an opening. The indicator 96 may be an opening formed in one of the side walls 94 of the inner member 82.

The outer tube 84 has an elongate body 98 having opposed first and second ends 100, 102 and a longitudinal passage sized to receive the inner member 82. The housing 86 has opposed first and second ends 104, 106. As shown in FIGS. 4 and 9, the housing 86 has an elongate, tubular body 108 having a pair of opposed side walls 110 and a longitudinal passage sized to receive the outer tube 84. Preferably, a viewing slot 112 is formed in one of the side walls 110 of the housing 86. Preferably, the inner member 82, the outer tube 84, and the housing 86 each have a cross-sectional profile having the shape of a rectangle.

With reference to FIG. 3, the beam assembly 74 is supported on the track frame 26. The inner member 82 of the beam assembly 74 is coupled to the first support element 60 of the track frame 26. As shown in FIG. 3, the inner member 82 may be attached to the first support element 60 by a plurality of connectors 114. In other embodiments, the inner member 82 and the first support element 60 may be welded together or the inner member 82 may be formed as an integral component of the first support element 60.

The outer tube 84 is coupled to the second support element 62 of the track frame 26. As shown in FIG. 3, the outer tube 84 may be attached to the second support element 62 by an attachment plate 116 or any other suitable connector. In other embodiments, the outer tube 84 and the second support element 62 may be welded together or the outer tube 84 may be formed as an integral component of the second support element 62. The housing 86 may be attached to the outer tube 84 or the second support element 62 of the track frame 26. In embodiments, the housing 86 may be formed as an integral component of the outer tube 84 or the second support element 62 of the track frame 26.

Turning to FIGS. 4-8, the linear actuator 76 comprises an attachment block 118, a lead screw 120, and a locking nut 122. The attachment block 118 may be attached to the housing 86 by a plurality of connectors 124.

The lead screw 120 has opposed first and second ends 126, 128. Adjacent the first end 126, the lead screw 120 has a threaded portion. The lead screw 120 is threaded through the locking nut 122 and an opening formed in the attachment block 118. Turning the lead screw 120 adjusts the position of the lead screw 120 relative to the attachment block 118. When the desired adjustment is achieved, the position of the lead screw 120 may be maintained by turning the locking nut 122 until it contacts the attachment block 118. While the linear actuator 76 shown in the Figures comprises a lead screw 120, the linear actuator 76 may be any suitable device for creating linear motion, including a jack screw or a cylinder assembly. Although the linear actuator 76 is shown supported on the housing 86, in other embodiments, the linear actuator 76 may be supported on the outer tube 84.

With reference to FIGS. 5-8, the cage assembly 78 has opposed open and closed ends 132, 134 and an outer shell 136 at least partially surrounding the open end 132. The outer shell 136 may have a pair of parallel, spaced-apart side arms 138, in which an opening 140 is formed in each side arm 138. Each opening 140 may be formed as any suitable shape including the shape of a notch, a slot, or a circular hole.

Continuing with FIGS. 5-8, the compression spring 80 has a pair of opposed ends 142 that may be forced toward each other when under pressure and that spring back when the pressure is released. The compression spring 80 may have a body 144 formed from a strong, durable, and elastic material, such as rubber. As shown in the Figures, the body 144 of the compression spring 80 has a cylindrical shape. However, the body 144 may have any suitable shape including the shape of a polygonal prism. In another embodiment, the compression spring 80 may have a spiral body formed from a strong and durable material, such as steel.

FIGS. 4-7 show how the track tensioning assembly 28 is assembled. The beam assembly components are arranged in telescoping relationship. In such arrangement, the inner member 82 is at least partially received within the outer tube 84 and the outer tube 84 is at least partially received within the housing 86. The second end 92 of the inner member 82 is telescopically received within the open end 132 of the cage assembly 78. The compression spring 80 is positioned within the outer shell 136 of is the cage assembly 78 so that one end 142 of the compression spring 80 contacts the second end 92 of the inner member 82 and the other end 142 of the compression spring 80 contacts the closed end 134 of the cage assembly 78. The linear actuator 76 is supported on the housing 86 and is situated so that the lead screw 120 contacts the closed end 134 of the cage assembly 78.

In the assembled track assembly 16 of FIG. 2, the track 22 is stretched around the drive sprocket 20 and the rollers 24. The first support element 60 and its attached first idler wheel 48 are coupled to the inner member 82. The second support element 62 and its attached second idler wheel 50 are coupled to the outer tube 84. By using the tensioning assembly 28 to increase or decrease the distance between the first and second idler wheels 48, 50, the tension within the track 22 is adjusted.

The lead screw 120 is turned to adjust the track tension. By turning the lead screw 120 in a first direction, the cage assembly 78, compression spring 80, and inner member 82 are urged forward in direction D, as shown in FIG. 4. Sliding, the inner member 82 forward causes its attached first idler wheel 48 to move forward as well. As the first idler wheel 48 moves forward, it moves away from the second idler wheel 50, which increases the tension on the track 22, By turning the lead screw 120 in the opposite direction, the first and second idler wheels 48, 50 are moved toward each other, decreasing the tension on the track 22.

Referring to FIGS. 8 and 9, the operator can determine the degree of track tensioning by observing the position of one of the openings 140 formed in the cage assembly 78 relative to the position of the indicator 96 carried by the inner member 82. As the lead screw 120 is rotated, the arms 138 of the cage assembly 78 slide over the side walls 94 of the inner member 82. The compression spring 80 is designed to compress to a particular length when it is under a load that occurs when the track 22 is under the proper amount of tension. The indicator 96 and the opening 140 are situated on their is respective components such that when the track 22 is properly tensioned, the indicator 96 underlies the opening 140. By looking, through the viewing slot 112 in the housing 86, the operator can observe the position of the opening 140 relative to the indicator 96. Since the indicator 96 underlies the opening 140 when the track 22 is properly tensioned, the operator can adjust and monitor the track tensioning using only measurement tools that are integral to the track tensioning assembly 28.

Changes may be made in the construction, operation and arrangement of the various parts, elements, steps and procedures described herein without departing from the spirit and scope of the invention as described in the following claims.

The invention claimed is:

1. A track assembly for a vehicle, comprising:
   an elongate track frame having opposed ends;
   a first idler wheel movably supported by the track frame at or adjacent one of its ends;
   a second idler wheel statically supported by the track frame at or adjacent an end opposite the first idler wheel;
   an endless track that surrounds each idler wheel; and
   a track tensioning assembly, comprising:
      a static elongate outer tube supported by the track frame;
      a longitudinally movable elongate inner member having opposed first and second ends, partially received within the outer tube in telescoping relationship thereto, carrying a compact external indicator at or adjacent its second end and coupled to the first idler wheel at its first end;
      a cage assembly having opposed open and closed ends and an outer shell at least partially surrounding the open end, the outer shell having at least one opening formed therein; and
      a compressible spring housed within the cage assembly and engaging the inner member at its second end;
   in which the inner member is telescopically receivable, at its second end, within the open end of the cage assembly, and the opening is alignable with the indicator in response to relative longitudinal movement of the inner member and the cage assembly.

2. The track assembly of claim 1, further comprising:
   a linear actuator supported by the track frame and engageable with the closed end of the cage assembly.

3. The track assembly of claim 1, further comprising:
   a housing at least partially surrounding the tensioning assembly and having a viewing window in which the inner member of the track tensioning assembly is configured so that the indicator may underlie the window.

4. A vehicle, comprising:
   a chassis;
   and
   a plurality of the track assemblies of claim 1 disposed in ground-engaging relationship and supporting the chassis.

5. A tensioning assembly, comprising:
   an elongate member configured for sliding movement on a frame of an endless track assembly, the elongate member having opposed first and second ends and carrying a compact external indicator at or adjacent its second end;
   a cage assembly having opposed open and closed ends and an outer shell at least partially surrounding the open end, the outer shell having at least one opening formed therein; and
   a compressible spring housed within the cage assembly and engaging the elongate member at its second end;
   in which the elongate member is receivable, at its second end, within the open end of the cage assembly, and the opening is alignable with the indicator in response to relative longitudinal movement of the elongate member and the cage assembly.

6. The tensioning assembly of claim 5 in which the first end of the elongate member is configured for coupling to an idler wheel.

7. The tensioning assembly of claim 5 in which the indicator is an opening formed in the elongate member.

8. The tensioning assembly of claim 5, further comprising:
   a linear actuator engaging the closed end of the cage member.

9. A track assembly, comprising:
   a rotatable drive sprocket;
   a flexible, endless track supported on the drive sprocket;

an elongate frame having a longitudinal axis and opposed first and second end sections capable of relative axial movement;

the tensioning assembly of claim 5, the elongate member of which is coupled to the first end section of the frame; and a plurality of track-engaging rollers supported on the frame and comprising:
   a first idler roller mounted on the first end section of the frame; and
   a second idler roller mounted on the second end section of the frame.

10. The track assembly of claim 9 in which the drive sprocket is rotatable relative to the frame.

11. The track assembly of claim 9 further comprising:
a linear actuator supported by the frame and engageable with the closed end of the cage assembly.

12. The track assembly of claim 11 in which the linear actuator is adjustable between an extended position that increases track tension and a retracted position that decreases track tension.

13. The track assembly of claim 12 in which relative positions of the opening and indicator are responsive to movement of the linear actuator.

14. A vehicle, comprising:
a chassis; and
a plurality of the track assemblies of claim 9 disposed in ground-engaging relationship and supporting the chassis.

* * * * *

UNITED STATES PATENT AND TRADEMARK OFFICE
CERTIFICATE OF CORRECTION

PATENT NO. : 10,435,092 B2
APPLICATION NO. : 15/724409
DATED : October 8, 2019
INVENTOR(S) : Vernon T. Stellman Page 1 of 1

It is certified that error appears in the above-identified patent and that said Letters Patent is hereby corrected as shown below:

In the Specification

Column 2, Line 40, please delete "it" and substitute therefore "1".
Column 2, Line 64, please delete "is".
Column 5, Line 9, please delete "is".
Column 5, Line 46, please delete "is".

Signed and Sealed this
Twelfth Day of November, 2019

Andrei Iancu
*Director of the United States Patent and Trademark Office*